(12) United States Patent  
Duerkopp et al.

(10) Patent No.: US 10,940,789 B2  
(45) Date of Patent: Mar. 9, 2021

(54) ADJUSTMENT UNIT FOR THE RANGE OF A HEADLIGHT FOR A VEHICLE

(71) Applicant: HELLA GMBH & CO. KGAA, Lippstadt (DE)

(72) Inventors: Michael Duerkopp, Rietberg (DE); Michael Eusterbrock, Rietberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/577,447

(22) Filed: Sep. 20, 2019

(65) Prior Publication Data

US 2020/0017020 A1 Jan. 16, 2020

Related U.S. Application Data

(63) Continuation of application No. PCT/EP2017/056496, filed on Mar. 20, 2017.

(51) Int. Cl.
| | |
|---|---|
| *B60Q 1/068* | (2006.01) |
| *F21S 41/60* | (2018.01) |
| *B60Q 1/00* | (2006.01) |
| *B60Q 1/04* | (2006.01) |

(52) U.S. Cl.
CPC ......... *B60Q 1/0683* (2013.01); *B60Q 1/0064* (2013.01); *B60Q 1/045* (2013.01); *F21S 41/60* (2018.01); *B60Q 2200/30* (2013.01)

(58) Field of Classification Search
CPC .... B60Q 1/0683; B60Q 1/0686; B60Q 1/045; B60Q 2200/30; F21S 41/60
See application file for complete search history.

(56) References Cited

U.S. PATENT DOCUMENTS

| 9,067,532 | B2 | 6/2015 | Herbin et al. | |
|---|---|---|---|---|
| 9,593,751 | B2* | 3/2017 | Lee | B60Q 1/076 |
| 2003/0174512 | A1 | 9/2003 | Rohr | |
| 2004/0090780 | A1* | 5/2004 | Burton | B60Q 1/0683 362/273 |
| 2011/0032716 | A1* | 2/2011 | Burton | B60Q 1/068 362/460 |
| 2011/0085346 | A1* | 4/2011 | Herbin | B60Q 1/0683 362/523 |
| 2014/0146550 | A1* | 5/2014 | Leisse | B60Q 1/0433 362/460 |

FOREIGN PATENT DOCUMENTS

| DE | 202 04 244 U1 | 7/2002 |
|---|---|---|
| DE | 10 2005 037 074 A1 | 2/2007 |
| EP | 2 263 914 A1 | 12/2010 |
| EP | 2 308 720 A1 | 4/2011 |

* cited by examiner

*Primary Examiner* — William N Harris  
(74) *Attorney, Agent, or Firm* — Muncy, Geissler, Olds & Lowe, P.C.

(57) ABSTRACT

An adjustment unit for the mechanical adjustment of the beam range of at least one light unit of a headlight for a vehicle, comprising a main adjustment shaft, wherein the main adjustment shaft is rotatable arranged at a housing of the headlight and wherein the main adjustment shaft comprises or is coupled with a screw member, by means of which a rotary motion of the shaft can be caused in a shaft axis in order to adjust the beam range of the at least one light unit. According to the invention the main adjustment shaft comprises an engagement component, which is configured to engage with a counter engagement geometry when tilting the main adjustment shaft about a tilting axis.

13 Claims, 4 Drawing Sheets

ADJUSTMENT UNIT FOR THE RANGE OF A HEADLIGHT FOR A VEHICLE

This nonprovisional application is a continuation of International Application No. PCT/EP2017/056496, which was filed on Mar. 20, 2017, and which is herein incorporated by reference.

BACKGROUND OF THE INVENTION

Field of the Invention

The present invention relates to an adjustment unit for the mechanical adjustment of the beam range of at least one light unit of a headlight for a vehicle, comprising a main adjustment shaft, wherein the main adjustment shaft is rotatable arranged at a housing of the headlight, and wherein the main adjustment shaft comprises or is at least coupled with a screw member, by means of which a rotary motion of the main adjustment shaft can be caused in a shaft axis in order to adjust the at least one light unit.

Description of the Background Art

DE 202 04 244 U1, which corresponds to US 2003/0174512, discloses an adjustment unit for the mechanical adjustment of the beam range of at least one light unit of a headlight for a vehicle. The adjustment unit comprises a screw member, which is coupled to a main adjustment shaft. When the screw member is rotated by means of a tool, the rotating main adjustment shaft leads to a tilting of the light unit about a horizontal axis and thus to an adjustment of the beam range of the light unit. In order to prevent an unallowed adjustment of the light unit, a cover element is provided which can be pressed onto the opening via which it is given access to the screw member, and thus, it is prevented that the screw member can be screwed by means of a tool. The cover element is snapped into a receiver, such that—once snapped into the receiver—the cover element cannot be removed from the receiver.

Unfortunately, when it is possible to access the main adjustment shaft form outside, it might be possible to rotate the main adjustment shaft, because the cover element does not engage with and thus lock the screw member. This leads to an unallowed maladjustment.

Another disadvantage is the fact that it is not possible to see whether the adjustment unit has been manipulated or not. At the same time, it should be possible for the original equipment manufacturer to use an exchange element, after a subsequent adjustment has been performed e.g. by a service technician of the manufacturer. By using an exchange element, the original condition of the adjustment unit can be restored. Accordingly, it is desirable that a destroyable exchange element is provided, which is only available by the original equipment manufacturer.

SUMMARY OF THE INVENTION

It is therefore an object of the present invention to provide an adjustment unit which is lockable against an unwanted adjustment of the light unit and which is designed so that manipulation is visible from the outside. In particular, it is an objective to provide at least one exchangeable element to restore the adjustment unit in the original condition.

The invention discloses the technical teaching that the main adjustment shaft comprises an engagement component, which is configured to engage with a counter engagement geometry when tilting the main adjustment shaft about a tilting axis.

The main idea of the invention is an adjustment unit which is easy to use for adjusting the at least one light unit in the headlight by screwing the screw member with a tool, wherein after screwing the screw member, the main adjustment shaft can be easily locked against a further rotational movement. According to the invention, for locking the rotational degree of freedom of the main adjustment shaft and thus for locking the beam range of the light unit of the headlight, it is only required to do a sidewise movement of the main adjustment shaft. More concrete, by means of the sidewise moving of the main adjustment shaft the main adjustment shaft is tilted about a tiling axis spaced apart from the screw member. Due to the tilting of the main adjustment shaft the engagement component of the main adjustment shaft is transferred into a position in which it is engaged with the counter engagement geometry. Due to the engagement of the engagement component with the counter engagement geometry, a rotation of the main adjustment shaft by means of the screw member or by rotating the main adjustment shaft is no longer possible. Thus, after locking the main adjustment shaft, it is also no longer possible to manually change the beam range of the light unit.

The moving of the screw member in a sidewise direction can be accomplished by a user, e.g. a manufacturer's technician doing the manual adjustment of the beam range of the light unit before the headlight is delivered to a customer. In particular, it can be easily inspected, if the adjustment has been carried out and if the manual adjustment has finally been locked, as it is visible from the outside of the headlight if the main adjustment shaft (in particular combined with the screw member) is moved sidewise and in its locking position.

A tilting axis can be oriented perpendicular to the shaft axis. In particular, the main adjustment shaft may be interconnected to at least one transmission shaft by means of a transmission gear, wherein the tilting axis runs through the transmission gear. According to this embodiment, the gear train is not (or at least nearly not) influenced by tilting the main adjustment shaft and by tilting a gear wheel of the gear train. Typically, the tilting angle is in the range of about 2 to 10.

Due to such a small tilting angle, there is no risk of damages of the adjustment unit.

A clip element can be provided, wherein the main adjustment shaft is at least indirectly connected to the clip element. In a first state, the clip element is used to hold the main adjustment shaft in a releasing position in which the engagement component is unlocked. From this state, the clip element can be selectively transferred into a second state, in which the main adjustment shaft is tilted with regard to its position in the releasing position and in which the engagement component engages with the counter engagement geometry such that the main adjustment shaft is transferred into a locking position. In particular, the clip element is configured to hold the main adjustment shaft and the screw member, respectively, either in the releasing position or in the locking position.

The clip element can be formed as a single part separate from the main adjustment shaft and separate from the screw member. The clip element is optional attachable to the housing of the headlight depending on whether the locking system according to the invention is required or not, and when the clip element is once attached to the housing, it is not possible to remove the clip element in a non-destructive manner.

The clip element can comprise a snap-fit which is configured such that in the releasing position the snap-fit is snapped into a first locking groove and in the locking position the snap-fit is snapped into a second locking groove. Advantageously, the first and the second locking groove are formed in the housing, wherein there is no access to the snap-fit from the outside of the housing once the clip element is attached to the housing. This prevents the adjustment unit from a manipulation, because it is not possible to release the snap-fit from the locking groove, in particular from the second locking groove.

In order to have some indicator indicating, whether the adjustment unit has been manipulated or not, it is preferred that the clip element comprises a rated break point element, which is automatically destroyed when the clip element is moved from its position corresponding to the releasing position into its position corresponding to the locking position of the main adjustment shaft. Moreover, the clip element may be configured such that it cannot be removed from its engaging position with the second locking groove back to its engaging position with the first locking groove without a destroying the clip element.

The screw member can be connected to the main adjustment shaft by means of a coupler forming an overload clutch, wherein the screw member is received in the clip element. As the engagement component is part of the main adjustment shaft, it is not possible to further rotate the main adjustment shaft after the engagement component is engaged with the counter engagement geometry, because the coupler in form of the overload clutch does not transmit higher torque from the screw member into the main adjustment shaft. Accordingly, it is not possible to unlock the engagement component from the counter engagement geometry by screwing the screw member.

The rated break point element can be visible from an outside view point of the headlight such that it is possible to recognize whether the adjustment unit has been manipulated.

The counter engagement geometry can be preferably provided at the housing of the headlight. This leads to the advantage that no additional element is necessary to form the counter engagement geometry.

The engagement component and the counter engagement geometry are preferably configured such that when the engagement component is engaged with the counter engagement geometry a rotational movement of the main adjustment shaft is prohibited.

In order to enable the prohibition of rotating the shaft in the locking position the engagement component comprises a section with a serrated outer circumference and the counter engagement geometry comprises a receiving section with a correspondingly serrated geometry and/or with at least one projection extending in tilting direction.

The invention is also directed to a headlight for a vehicle comprising a housing, at least one light unit and an adjustment unit for the mechanical adjustment of the beam range of the at least one light unit, wherein the adjustment unit is configured as described above.

Further scope of applicability of the present invention will become apparent from the detailed description given hereinafter. However, it should be understood that the detailed description and specific examples, while indicating preferred embodiments of the invention, are given by way of illustration only, since various changes, combinaitons, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
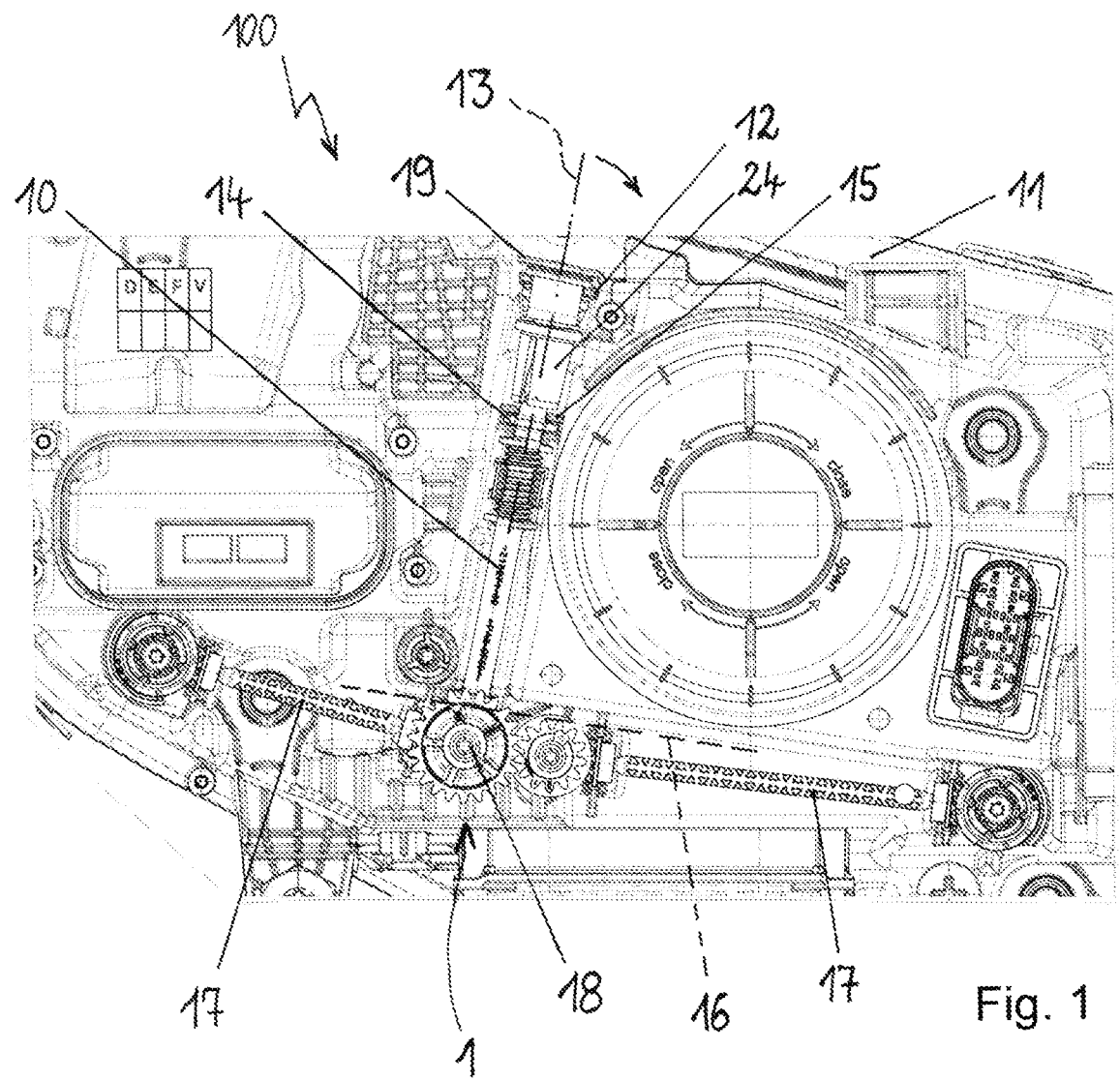
FIG. 1 shows a part of the housing of a headlight with an adjustment unit which is arranged at the housing.

FIG. 1 shows an adjustment unit 1 for the mechanical adjustment of the beam range of at least one light unit of a headlight 100 for a vehicle, wherein the headlight 100 is shown with its housing 11 from a backside. The headlight 100 may comprise e.g. two light units which are received within the housing 11. The beam range of the light units is adjustable by means of the adjustment unit 1. The adjustment of the light units has to be done when the headlight 100 is mounted to the vehicle. After adjusting the light units such that the beam range is in accordance with the legal requirements, the adjusting unit 1 is closed and it is desired that it is not used any more, e.g. by a driver of the vehicle. In order to take the adjustment unit 1 out of service, the adjustment unit 1 is configured with the inventive features, which are described in the following in more detail.

The adjustment unit 1 comprises a main adjustment shaft 10, which extends along a shaft axis 13. The main adjustment shaft 10 is rotatable arranged at the housing 11. A screw member 12 is coupled to the main adjustment shaft 10 via a coupler 24, wherein the screw member 12 can be screwed by means of a tool from the outside of the housing 11.

The main adjustment shaft 10 extends between the screw member 12 on the upper side and a transmission gear 18 on the lower side. The transmission gear 18 couples the main adjustment shaft 10 with transmission shafts 17, wherein a first transmission shaft 17 is coupled to a first light unit and a second transmission shaft 17 is coupled to a second light unit. On the upper side of the main adjustment shaft 10, the screw member 12 is received within a clip element 19, wherein the clip element 19 is attached to the housing 11.

According to the invention, the main adjustment shaft 10 comprises an engagement component 14, which is configured such that it can be brought into engagement with a counter engagement geometry 15 via tilting the main adjustment shaft 10 about a tilting axis 16. The tilting axis 16 is directed perpendicular to the shaft axis 13 and runs through the transmission gear 18. In other words, the main adjustment shaft 10 is tiltable within the transmission gear 18 without influencing the teeth of the gear wheels forming the transmission gear 18. By means of the following FIGS. 2 and 3, the tilting of the main adjustment shaft 10 is shown in more detail.

Figure 2:
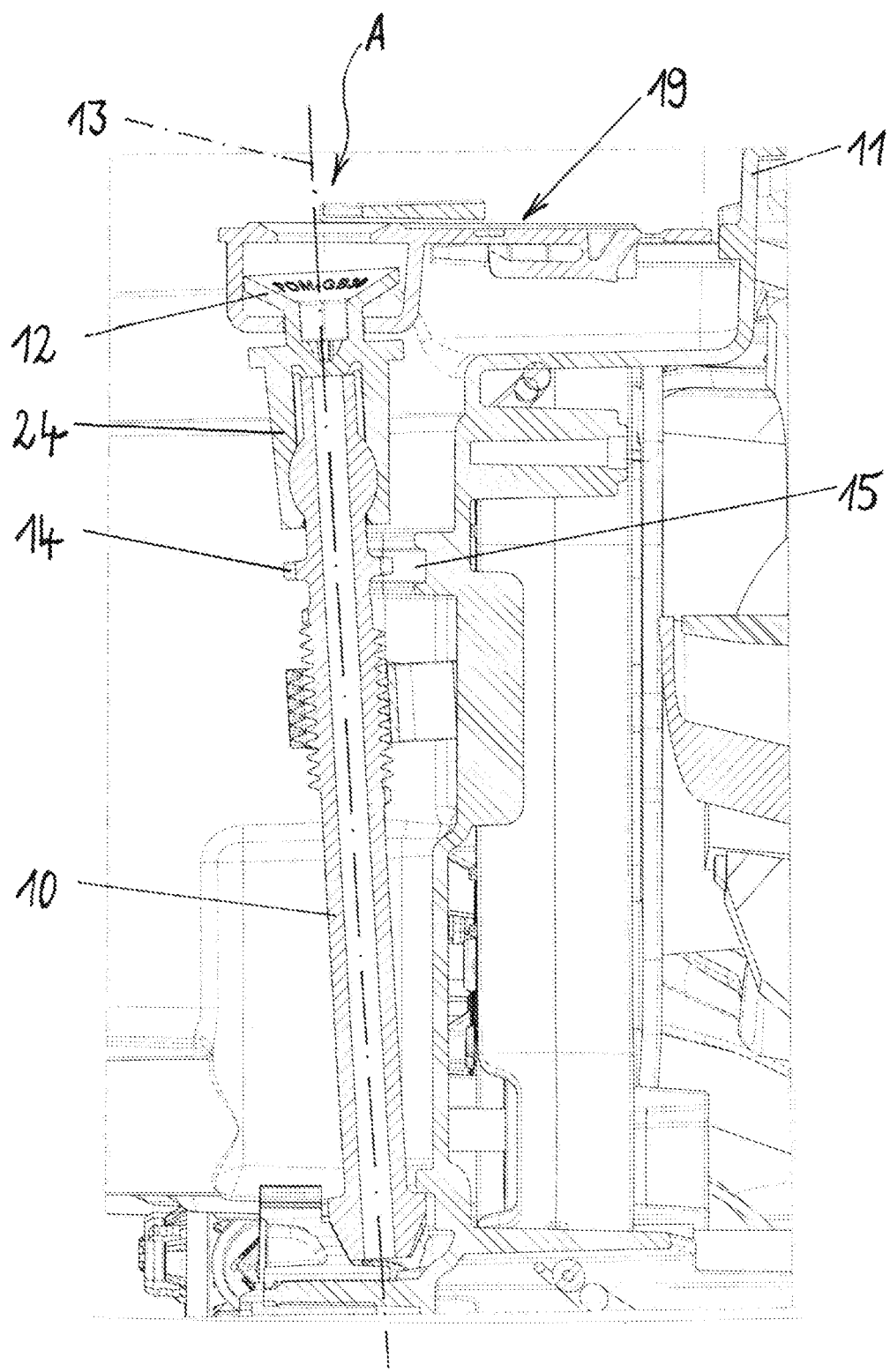
FIG. 2 shows a detailed view of a main adjustment shaft of the adjustment unit according to FIG. 1, wherein the main adjustment shaft is arranged at the housing in a releasing position.

FIG. 2 shows the arrangement of the main adjustment shaft 10 at the housing 11 in a releasing position A. The main adjustment shaft 13 extends in the longitudinal direction along the shaft axis 13, and the shaft axis 13 extends in a basic direction which causes a disengagement of the engagement component 14 from the counter engagement geometry 15 at the housing 11.

The screw member 12 is coupled to the upper end of the main adjustment shaft 10 via the coupler 24, and the screw member 12 is received within a clip element 19. The clip element 19 is arranged in a position corresponding to the releasing position A of the engagement component 14 with respect to the counter engagement component 15.

Figure 3:
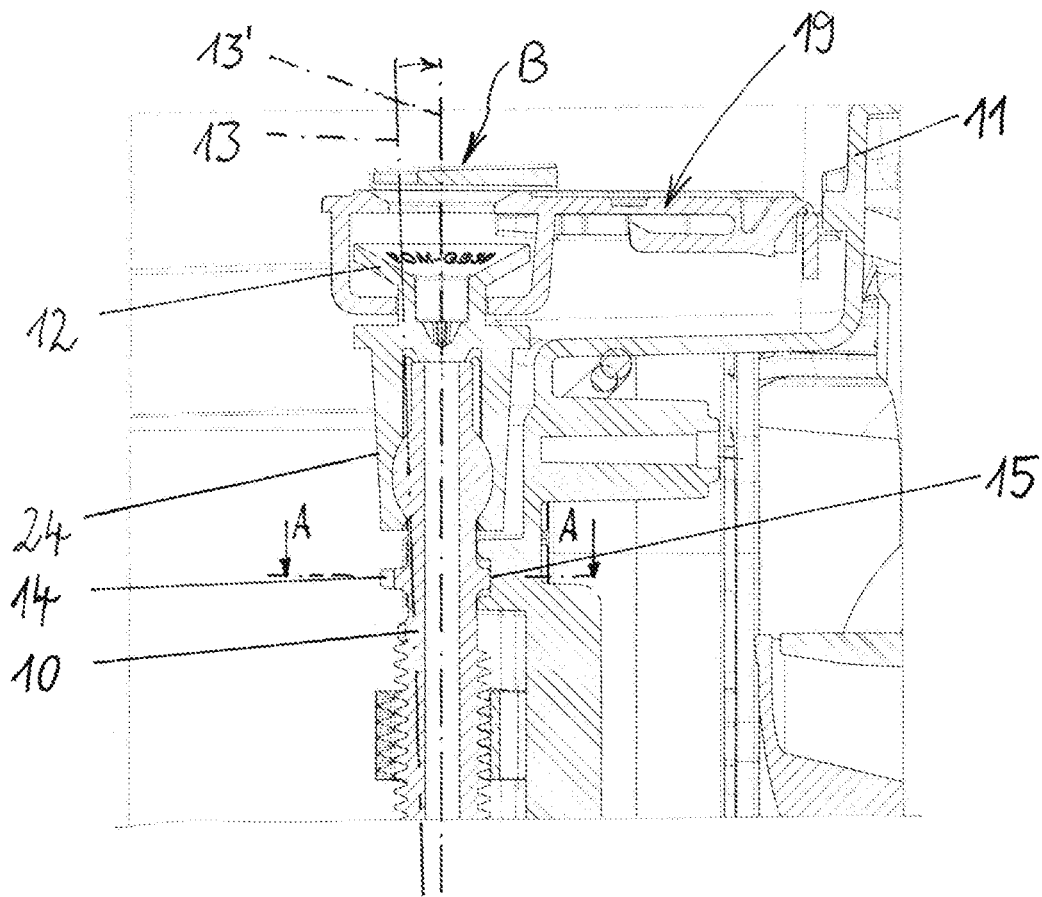
FIG. 3 shows the main adjustment shaft arranged at the housing in a locking position.

FIG. 3 shows the depiction of the main adjustment shaft 10 and the screw member 12, received in the clip element 19, wherein the screw member 12 is coupled to the main adjustment shaft 10 via the coupler 24. By tilting the main adjustment shaft 10, the shaft axis 13 is tilted into a new position of the shaft axis 13'. Via this transfer of the main adjustment shaft 10 from its releasing position A to its locking position B, the engagement component 14 are brought into engagement with the counter engagement geometry 15. Due to the engagement, the main adjustment shaft 10 is not rotatable any more. Instead, when the screw member 12 is screwed by means of a tool, the screw member 12 slips through the coupler 24. Thus, it is not possible to rotate the main adjustment shaft 10, neither direct at the main adjustment shaft 10 nor by means of the screw member 12.

Figure 4:
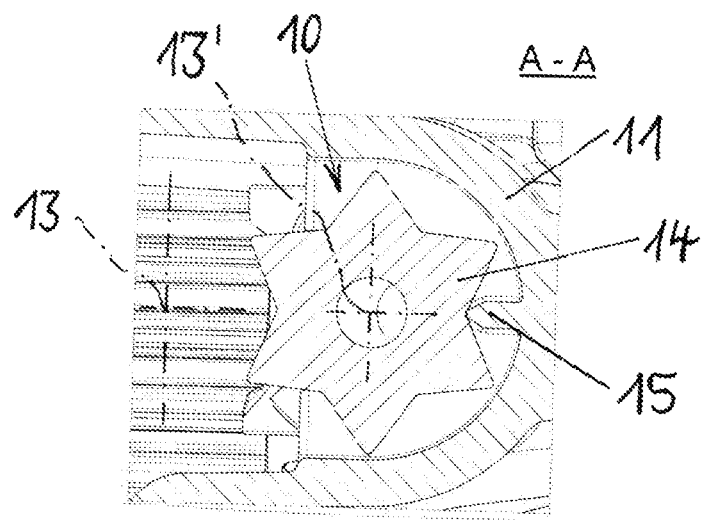
FIG. 4 shows a detailed view of the adjustment shaft with an engagement component engaged with a counter engagement geometry relating to the section A-A in FIG. 3.

FIG. 4 shows a cross-section A-A shown in FIG. 3 of the main adjustment shaft 10. The depiction shows the engagement component 14 at the shaft 10 engaging with the counter engagement geometry 15 at the housing 11. Due to the tilted position of the shaft axis 13' relative to the basic position of the shaft axis 13, the engagement component is not detachable from the counter engagement geometry 15, because the clip element 19 holds the main adjustment shaft 10 in the tilted position of the shaft axis 13', see FIG. 3.

Figure 5:
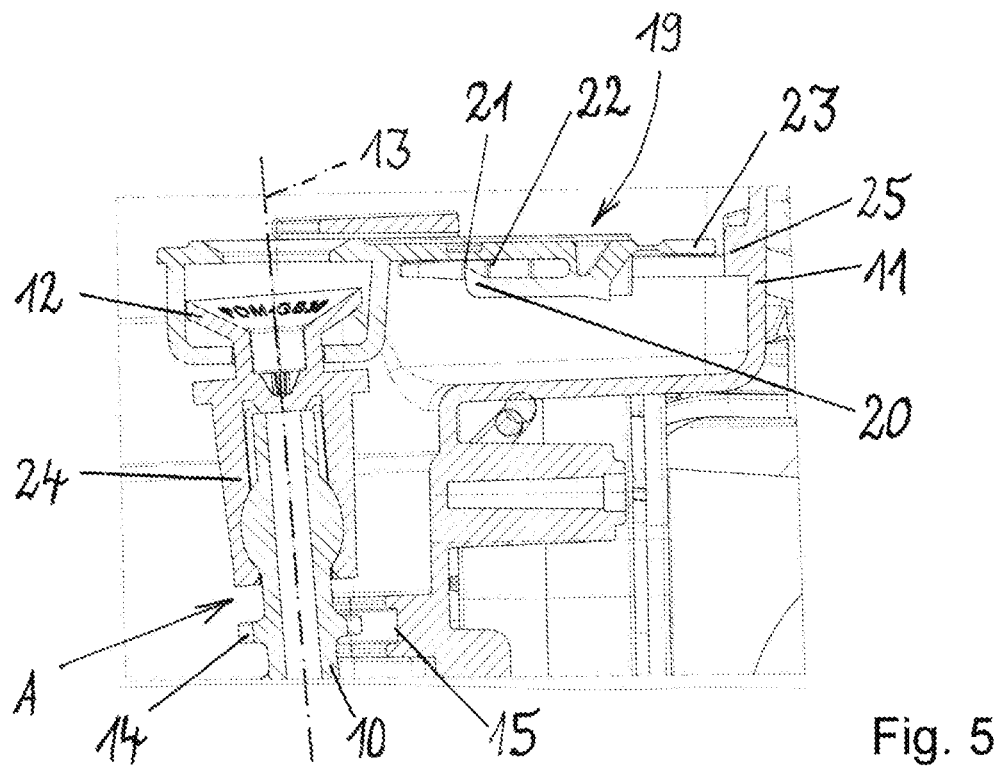
FIG. 5 shows a detailed view of a clip element of the adjustment unit in a releasing position and FIG. 6 shows the clip element according to FIG. 5 in a locking position.

FIG. 5 shows a detailed view of the arrangement of the clip element 19 attached to the housing 11. The clip element 19 receives the screw member 12 which is coupled to the main adjustment shaft 10 via the coupler 24, whereas the shaft axis 13 of the main adjustment shaft 10 is in its basic position. The clip element 19 comprises a snap-fit 20, which engages with a first locking groove 21 formed in the housing 11.

Moreover, the clip element 19 comprises a rated break point element 23, which is undamaged and which abuts against a protrusion 25 of the housing 11. As shown, the engagement component 14 is spaced apart from the counter engagement geometry 15, because the shaft axis 13 of the main adjustment shaft 10 extends in a releasing position A.

Figure 6:
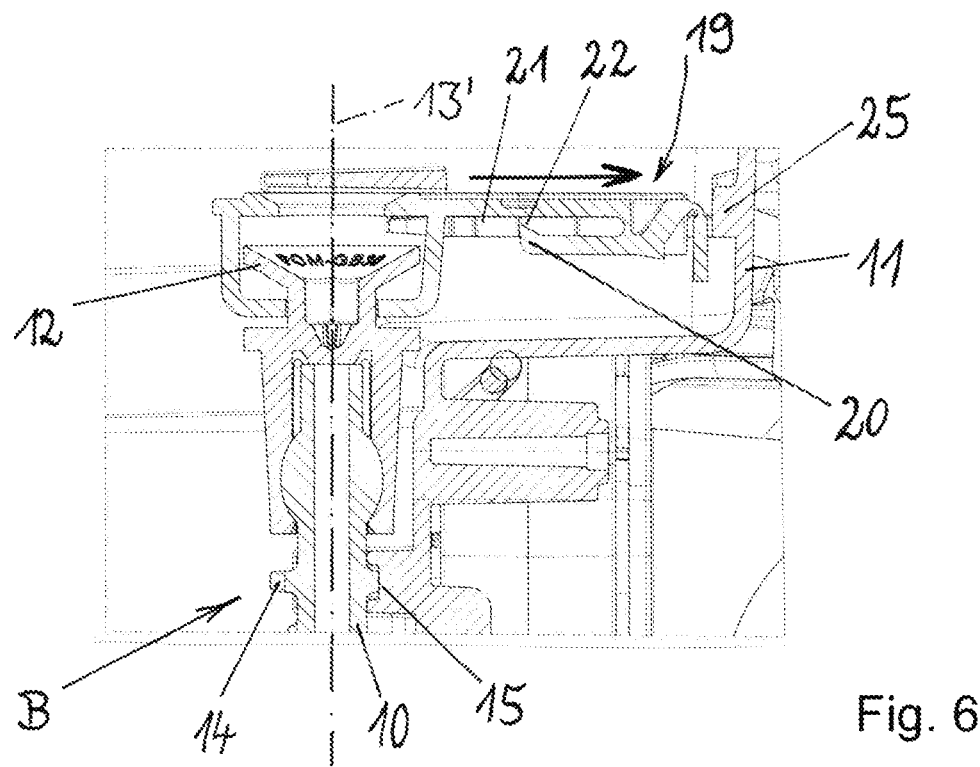

FIG. 6 finally shows the arrangement according to FIG. 5, but the main adjustment shaft 10 is tilted into a locking position B and the engagement component 14 engages with the counter engagement geometry 15, wherein the main adjustment shaft 10 now is oriented in the tilted position of the shaft axis 13'. The tilting can be carried out via a transversal movement of the clip element 19 according to the arrow as shown. When moving the clip element 19 into the position shown in FIG. 6, the rated break point element 23 gets damaged and the clip element 19 directly abuts against the protrusion 25. The damaging of the rated break point element 23 indicates that the adjustment unit 1 has already been transferred into the locking position B.

As shown in FIG. 6, the snap-fit 20 now engages with a second locking groove 22, wherein the shape of the snap-fit 20 is designed in a way, that the clip element 19 is only movable in the shown direction according to the arrow, but is not movable in opposite direction. As a result, the form fit of the snap-fit 20 within the second locking groove 22 cannot be manipulated, because the snap-fit 20 is arranged underneath the main part of the clip element 19 and is not accessible by a user from the upper side. In other words, the clip element 19 can only once be transferred into the shown locking position B, but it cannot be removed back to the releasing position A according to FIG. 5.

The present invention is not limited by the embodiment described above, which is represented as an example only and can be modified in various ways within the scope of protection defined by the depending patent claims. Thus, the invention is also applicable to different embodiments of the adjustment unit 1 in particular the design of the engagement component 14 interacting with the counter engagement geometry 15. In particular, the engagement component 14 can be designed as a single part with the main adjustment shaft 10 or forms a single part itself and is attached to the main adjustment shaft 10. Moreover, the counter engagement geometry 15 can be designed as a single part with the housing 11, e.g. in the form of a protrusion, a notch, a nose or the like.

Further, the counter engagement geometry 15 may be built separate from the housing 11, but attached to the housing 11.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adjustment unit for a mechanical adjustment of a beam range of at least one light unit of a headlight for a vehicle, the adjustment unit comprising:
    a main adjustment shaft rotatably arranged at a housing of the headlight; and
    a screw member coupled with the main adjustment shaft, the screw member causing a rotary motion of the main adjustment shaft about a shaft axis in order to adjust the beam range of the at least one light unit,
    wherein the main adjustment shaft comprises an engagement component that is configured to engage with a counter engagement geometry when tilting the main adjustment shaft about a tilting axis, and
    wherein the engagement component and the counter engagement geometry are configured such that when the engagement component is engaged with the counter engagement geometry, a rotational movement of the main adjustment shaft is prohibited.

2. The adjustment unit according to claim 1, wherein that the tilting axis is oriented substantially perpendicular to the shaft axis.

3. The adjustment unit according to claim 1, wherein the main adjustment shaft is interconnected to at least one transmission shaft via a transmission gear, and wherein the tilting axis runs through the transmission gear.

4. The adjustment unit according to claim 1, further comprising a clip element, wherein the main adjustment shaft is at least indirectly connected to the clip element, and wherein the clip element is configured to hold the main adjustment shaft in a releasing position in which the engagement component is unlocked and in a locking position in which the main adjustment shaft is tilted with regard to the releasing position and in which the engagement component is engaged with the counter engagement geometry.

5. An adjustment unit for a mechanical adjustment of a beam range of at least one light unit of a headlight for a vehicle, the adjustment unit comprising:
- a main adjustment shaft rotatably arranged at a housing of the headlight; and
- a screw member coupled with the main adjustment shaft, the screw member causing a rotary motion of the main adjustment shaft about a shaft axis in order to adjust the beam range of the at least one light unit,
- wherein the main adjustment shaft comprises an engagement component that is configured to engage with a counter engagement geometry when tilting the main adjustment shaft about a tilting axis
- wherein the main adjustment shaft comprises a clip element, the main adjustment shaft being at least indirectly connected to the clip element, and wherein the clip element is configured to hold the main adjustment shaft in a releasing position in which the engagement component is unlocked and in a locking position in which the main adjustment shaft is tilted with regard to the releasing position and in which the engagement component is engaged with the counter engagement geometry, and
- wherein the clip element is attached to the housing and comprises a snap-fit that is configured such that in the releasing position the snap-fit is snapped into a first locking groove and in the locking position the snap-fit is snapped into a second locking groove.

6. The adjustment unit according to claim 5, wherein the first locking groove and the second locking groove are formed from the housing and the snap-fit is inaccessible from the outside of the housing when the clip element is attached to the housing.

7. An adjustment unit for a mechanical adjustment of a beam range of at least one light unit of a headlight for a vehicle, the adjustment unit comprising:
- a main adjustment shaft rotatably arranged at a housing of the headlight; and
- a screw member coupled with the main adjustment shaft, the screw member causing a rotary motion of the main adjustment shaft about a shaft axis in order to adjust the beam range of the at least one light unit,
- wherein the main adjustment shaft comprises an engagement component that is configured to engage with a counter engagement geometry when tilting the main adjustment shaft about a tilting axis
- wherein the main adjustment shaft comprises a clip element, the main adjustment shaft being at least indirectly connected to the clip element, and wherein the clip element is configured to hold the main adjustment shaft in a releasing position in which the engagement component is unlocked and in a locking position in which the main adjustment shaft is tilted with regard to the releasing position and in which the engagement component is engaged with the counter engagement geometry, and
- wherein the clip element comprises a rated break point element, which is destroyed when the clip element is moved from a position corresponding to the releasing position to a position corresponding to the locking position.

8. The adjustment unit according to claim 5, wherein the snap-fit of the clip element cannot be moved from engagement with the second locking groove back into engagement with the first locking groove without destroying the clip element.

9. The adjustment unit according to claim 4, wherein the screw member is connected to the main adjustment shaft via a coupler forming an overload clutch, wherein the screw member is received in the clip element.

10. The adjustment unit according to claim 7, wherein the rated break point element is visible from an outside of the housing in order to recognize whether manipulation of the adjustment unit has been carried out.

11. The adjustment unit according to claim 1, wherein the counter engagement geometry is provided at the housing of the headlight.

12. The adjustment unit according to claim 1, wherein the engagement component comprises a section with a serrated outer circumference and the counter engagement geometry comprises a receiving section with a correspondingly serrated geometry and/or with at least one projection extending in a tilting direction.

13. A headlight for a vehicle comprising:
- a housing;
- at least one light unit; and
- an adjustment unit according to claim 1 for the mechanical adjustment of the beam range of the at least one light unit.

* * * * *